(12) United States Patent
Kimoto et al.

(10) Patent No.: US 11,670,999 B2
(45) Date of Patent: Jun. 6, 2023

(54) MAGNETIC COUPLING DEVICE

(71) Applicants: PROTERIAL, LTD., Tokyo (JP);
Tokyo Electron Limited, Tokyo (JP)

(72) Inventors: Akihiro Kimoto, Suita (JP);
Junnosuke Taguchi, Oshu (JP);
Satoshi Yoshimoto, Suita (JP);
Norihiko Kishimoto, Suita (JP); Keita Hayashi, Suita (JP)

(73) Assignees: PROTERIAL, LTD., Tokyo (JP);
TOKYO ELECTRON LIMITED, Tokyo (JP)

( * ) Notice: Subject to any disclaimer, the term of this patent is extended or adjusted under 35 U.S.C. 154(b) by 0 days.

(21) Appl. No.: 17/387,569

(22) Filed: Jul. 28, 2021

(65) Prior Publication Data
US 2022/0037977 A1 Feb. 3, 2022

(30) Foreign Application Priority Data
Jul. 30, 2020 (JP) .............................. JP2020-129000

(51) Int. Cl.
*H02K 49/10* (2006.01)
*F16H 49/00* (2006.01)

(52) U.S. Cl.
CPC ........... *H02K 49/102* (2013.01); *F16H 49/00* (2013.01)

(58) Field of Classification Search
CPC ...... H02K 49/00; H02K 49/10; H02K 49/102; H02K 49/108; F16H 49/00
USPC .................. 310/5 R, 103, 111, 14, 115, 152
See application file for complete search history.

(56) References Cited

U.S. PATENT DOCUMENTS

| | | | | |
|---|---|---|---|---|
| 6,054,788 | A | * 4/2000 | Dombrovski | H02K 49/108 310/75 D |
| 2011/0031837 | A1 | * 2/2011 | Kuritani | H02K 49/106 310/103 |
| 2018/0195173 | A1 | 7/2018 | Kato et al. | |

FOREIGN PATENT DOCUMENTS

| | | | | |
|---|---|---|---|---|
| DE | 3605899 A1 | * 8/1987 | ........... | H02K 49/108 |
| JP | 2005-114162 A | 4/2005 | | |
| JP | 2018-113431 A | 7/2018 | | |

* cited by examiner

*Primary Examiner* — Tran N Nguyen
(74) *Attorney, Agent, or Firm* — Sughrue Mion, PLLC

(57) ABSTRACT

A magnetic coupling device includes a driving magnet array having multiple annular sector-shaped, circumferentially arranged first permanent magnets, and a driven magnet array having multiple circular sector-shaped, circumferentially arranged second permanent magnets with pole surfaces facing pole surfaces of the first permanent magnets. The driven magnet array is rotated by the driving magnet array being rotated. A repulsion zone where a repulsive force acts is designed to have an area that is 5% to 15% of that of an attraction zone where an attractive force acts between a specific first permanent magnet and a specific second permanent magnet, with a radial first centerline of the specific first permanent magnet overlapping a radial second centerline of the specific second permanent magnet so that opposite poles face each other, including between first and second permanent magnets respectively adjacent the specific first and second permanent magnets with overlapping the centerlines.

8 Claims, 7 Drawing Sheets

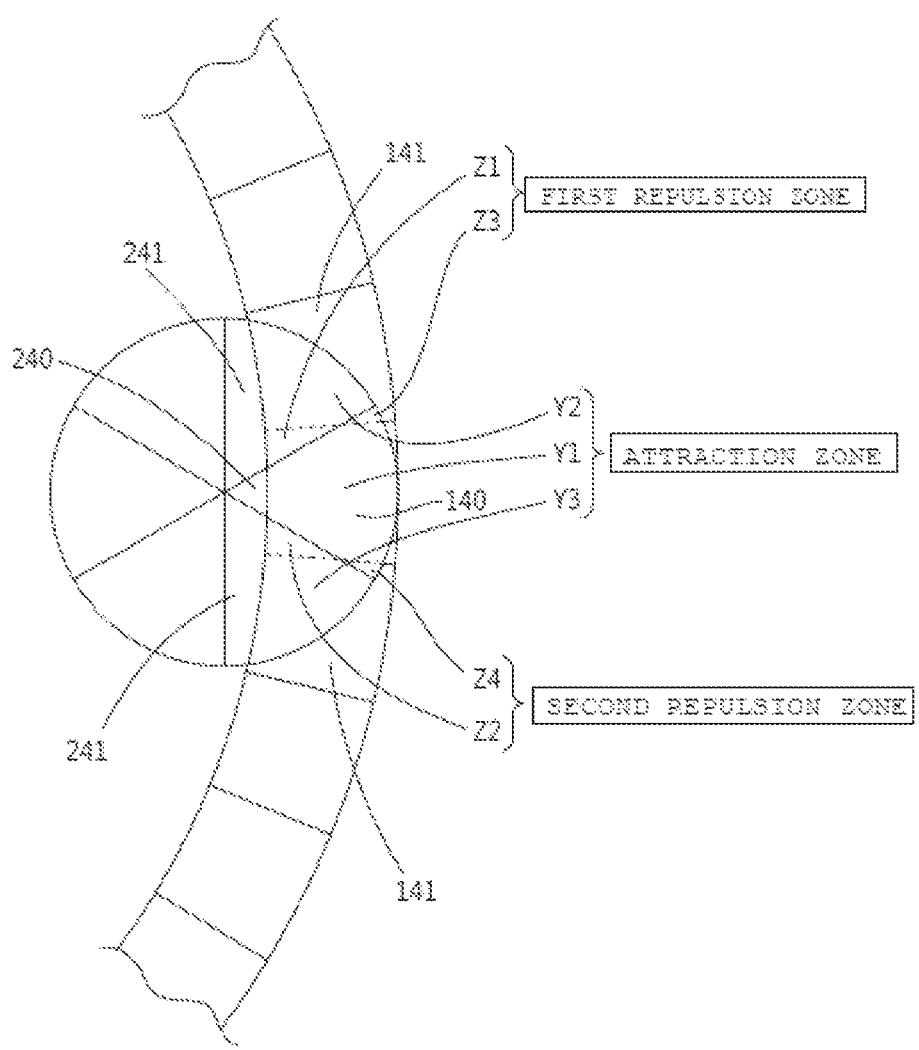

(a) (b)

A: MEASURED

B: IDEAL

A: MEASURED
B: IDEAL

A: MEASURED
B: IDEAL

MAGNETIC COUPLING DEVICE

BACKGROUND OF THE INVENTION

Field of the Invention

The present invention relates to a magnetic coupling device having a driving magnet array of a plurality of first permanent magnets arranged circumferentially and having alternating polarities, and a driven magnet array of a plurality of second permanent magnets arranged circumferentially and having alternating polarities, the pole surfaces of the first permanent magnets and the second permanent magnets facing each other, the driven magnet array being rotated by rotating the driving magnet array.

Description of the Related Art

Such magnetic couplings are known as a means of transmitting power in a non-contact manner. A vacuum deposition apparatus such as an ALD (Atomic Layer Deposition) system, for example, is used in a production process of semiconductors, in which a film is deposited on a deposition target such as a semiconductor wafer while rotating the wafer. Such a vacuum deposition apparatus uses a magnetic coupling device that has a plurality of driven magnet arrays arranged around the rotation axis of a driving magnet array to transmit rotation from the drive side to the driven side in a vacuum atmosphere that is physically shut out from the drive side, to allow deposition of various types of films on the rotating deposition target while shutting out particles generated from the power system of the drive side.

A substrate processing apparatus of Patent Document 1, for example, has rectangular strips of permanent magnets circumferentially arranged on the surface of a ring-like drive gear (driving magnet array), and rectangular strips of permanent magnets circumferentially arranged also on the surface of a driven gear (driven magnet array). A partition member is provided between the driven gear and the drive gear to divide the atmosphere from the vacuum atmosphere. A wafer is placed on a table that rotates with the driven gear.

Patent Document 2 discloses a magnetic gear that transmits torque by magnetic attraction and repulsion between magnetic teeth, which are permanent magnets radially arranged and having alternating N and S poles on the outer circumferential part of each rotating disc on the drive side and driven side facing each other with a predetermined gap therebetween. The permanent magnets used in this magnetic gear have a radial shape (e.g., involute curve).

PRIOR ART DOCUMENT

Patent Document

Patent Document 1: JP-A-2018-113431
Patent Document 2: JP-A-2005-114162

SUMMARY OF THE INVENTION

For uniform film deposition on the deposition target in the vacuum deposition apparatus described above, it is necessary to rotate the driven magnet array at a constant low speed of about 1 rpm in a stable manner. However, the magnetic coupling devices disclosed in Patent Documents 1 and 2 had issues of inability to rotate at constant speed, and of unstable movement when the rotation has started or is about to stop because of poor followability of the driven side.

The present invention was made in view of the circumstances described above, its object being to provide a magnetic coupling device capable of stable rotation at constant speed owing to good followability of the driven magnet array.

To solve the above problem, a magnetic coupling device according to the present invention includes: a driving magnet array having a plurality of first permanent magnets in an annular sector shape arranged to have alternating polarities along a circumferential direction; and a driven magnet array having a plurality of second permanent magnets in an annular or circular sector shape arranged to have alternating polarities along a circumferential direction and to have pole surfaces facing pole surfaces of the first permanent magnets, the driven magnet array being rotated by the driving magnet array being rotated, wherein with a first centerline in a radial direction of a specific one of the plurality of first permanent magnets overlapping a second centerline in a radial direction of a specific one of the plurality of second permanent magnets so that opposite poles face each other, a repulsion zone where a repulsive force acts is designed to have an area that is 5% to 15% of an area of an attraction zone where an attractive force acts, including a first permanent magnet adjacent the specific first permanent magnet and a second permanent magnet adjacent the specific second permanent magnet.

The functions and effects of the magnetic coupling device due to such a structure will be described. According to this structure, the first permanent magnets arranged in the driving magnet array have an annular sector shape. Here, an annular sector refers to a shape left after cutting off a circular sector with a smaller radius from a circular sector with a larger radius. Namely, it is a shape surrounded by two circular arcs and two radii. On the other hand, the second permanent magnets arranged in the driven magnet array have an annular, or circular, sector shape.

The plurality of first permanent magnets and second permanent magnets are arranged along the circumferential direction such as to have alternating magnetic poles. Namely, the magnets are arranged to have S pole and N pole alternately. Normally, the driven magnet array has a smaller radius than the driving magnet array and one or a plurality of driven magnet arrays are arranged relative to one driving magnet array. The driven magnet arrays can be rotated by rotating the driving magnet array.

In the above structure, the first permanent magnets and second permanent magnets are arranged so that the magnets have a predetermined positional relationship. Namely, with a first centerline in a radial direction of a specific first permanent magnet overlapping a second centerline in a radial direction of a specific second permanent magnet, and with opposite poles (N pole and S pole) facing each other, the area of repulsion zones is designed to be 5% to 15% of the area of attraction zones between the specific first permanent magnet and the specific second permanent magnet, including first and second permanent magnets adjacent the specific first permanent magnet and the specific second permanent magnet. It was confirmed that, with the zones designed to be in this range, the driven magnet array had better followability and was able to rotate stably at constant speed.

In the present invention, the first permanent magnets and the second permanent magnets should preferably be arranged tightly along a circumferential direction. Such a tight arrangement allows transmission of torque as desired.

In the present invention, it is preferable to provide a mechanism of moving the driven magnet array along the radial direction. With such a mechanism, it is possible to adjust the ratio of areas of the repulsion zone and the attraction zone suitably.

In the present invention, a pole piece made of a ferromagnet should preferably be provided on pole surfaces of the first permanent magnets and the second permanent magnets. This can make the magnetic fields more uniform.

BRIEF DESCRIPTION OF THE DRAWINGS

FIG. 2C is a partially enlarged view of FIG. 2A;

DETAILED DESCRIPTION OF THE PREFERRED EMBODIMENTS

Figure 1A:
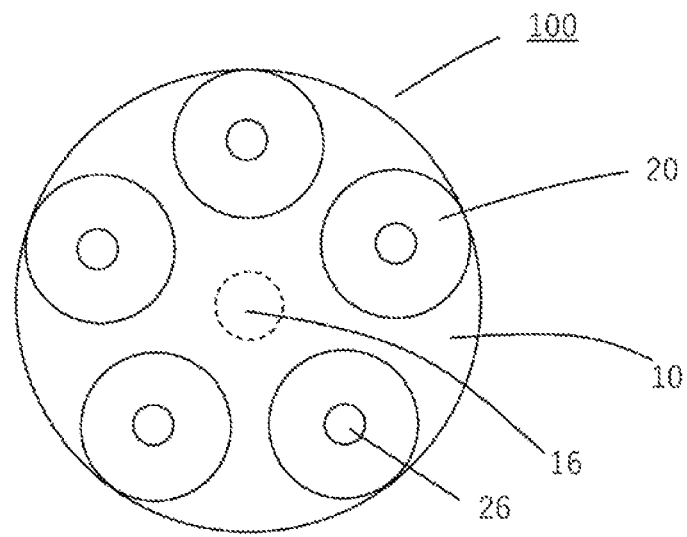
FIG. 1A is a plan view illustrating a schematic diagram of a magnetic coupling device 100 according to the present invention.
Figure 1B:
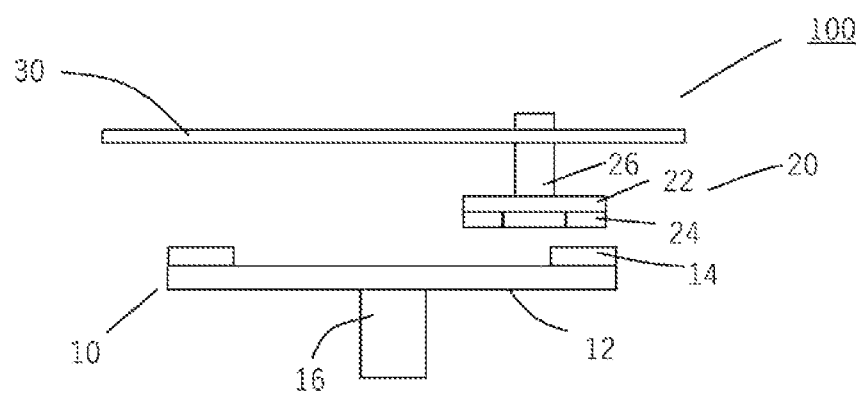
FIG. 1B is a side view (cross-sectional view) of the magnetic coupling device shown in FIG. 1A.
Figure 1C:
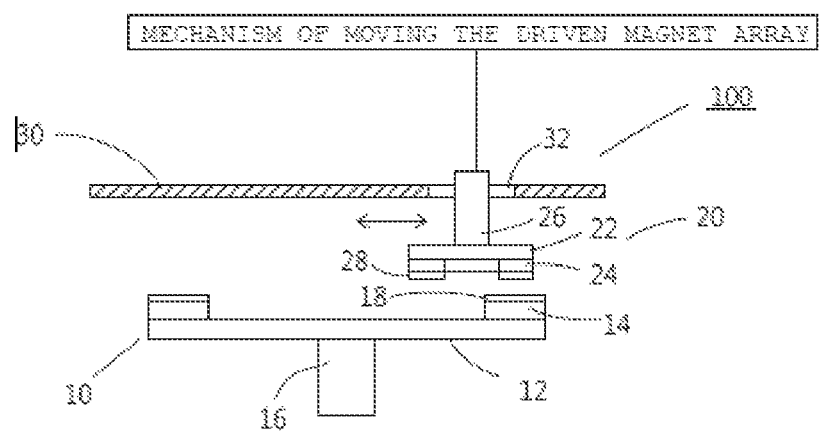
FIG. 1C is a view showing pole pieces and a mechanism of moving the driven magnet array as compared with FIG. 1B.
Figure 2A:
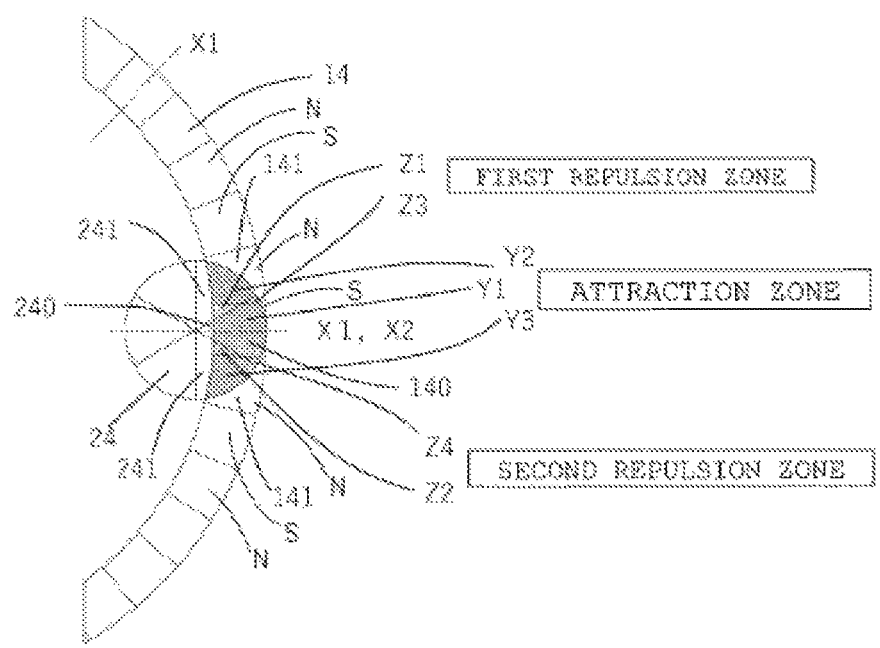
FIG. 2A is a plan view showing magnet arrangements of a driving magnet array and a driven magnet array, and their positional relationship.
Figure 2B:
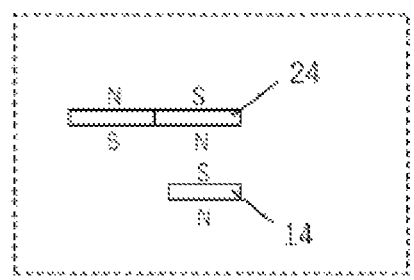
FIG. 2B is a cross-sectional view showing poles of the magnets.

First, a preferred embodiment of a magnetic coupling device according to the present invention is described. FIG. 1A is a plan view illustrating a schematic diagram of a magnetic coupling device 100 according to the present invention. FIG. 1B is a side view (cross-sectional view) of the magnetic coupling device shown in FIG. 1A. FIG. 1C is a view showing pole pieces and a mechanism of moving the driven magnet array as compared with FIG. 1B. FIG. 2A is a plan view showing magnet arrangements of a driving magnet array and a driven magnet array, and their positional relationship. FIG. 2B is a cross-sectional view showing poles of the magnets. FIG. 2C is a partially enlarged view of FIG. 2A with the shading omitted so that the boundary between a repulsion zone and an attraction zone can be more easily seen.

<Configuration of Magnetic Coupling Device>

A driving magnet array 10 has multiple first permanent magnets 14 arranged along a circumferential direction on a surface (upper surface) of a disc 12. FIG. 2A shows part of the disc 12, in which the first permanent magnets 14 are arranged to have alternating polarities, i.e., to have S pole and N pole alternately. The first permanent magnets 14 are fixed to the disc 12 by mechanical means such as screws. Alternatively, the magnets may be secured using an adhesive.

The driving magnet array 10 is driven by a motor or the like to rotate around a rotation axis 16. Any known drive system configuration may be used and illustration thereof is omitted here.

Five driven magnet arrays 20 are provided on a lower surface of a support plate 30. The number of the driven magnet arrays 20 is not limited to a particular value. The driven magnet arrays 20 can rotate around the rotation axes 26 and, as will be described later, follow and rotate when the driving magnet array 10 rotates.

The first permanent magnet 14 has a shape of an annular sector. Here, an annular sector refers to a shape left after cutting off a circular sector with a smaller radius from a circular sector with a larger radius. Namely, it is a shape surrounded by two circular arcs and two radii. The center of the circular arcs referred to here coincides with the center of the disc 12. The two radii are lines passing through the center of the disc 12.

The annular sector has four corners, which need not be sharp and may be rounded for reasons in terms of production or the like. Alternatively, a chamfer of a suitable size may be provided.

As illustrated in FIG. 2A, the first permanent magnets 14 are tightly arranged along the circumferential direction in a ring shape. The first permanent magnets 14 are formed in the shape of an annular sector so that the magnets are tightly arranged. "Tightly" refers to an arrangement with as little space as possible. The term does not necessarily mean complete absence of a space. There may exist a slight inevitable space depending on the surface roughness or the like of the first permanent magnets 14. Such cases are included in the definition of "tightly" as used herein. The same applies to cases where inevitable spaces are formed due to errors involved in assembly or production.

The number of the first permanent magnets 14 in the array (number of poles) is about 20 to 320, depending on the size of the magnetic coupling device 100.

The driven magnet array 20 has multiple second permanent magnets 24 arranged along the circumferential direction on the surface (lower surface) of a disc 22. As illustrated in FIG. 1B, the poles of the first permanent magnets 14 and the poles of the second permanent magnets 24 are disposed such as to face each other in parallel. The first permanent magnets 14 and the second permanent magnets 24 are arranged with a predetermined distance between their poles (see FIG. 2B, too). FIG. 1C is similar to FIG. 1B but further includes pole pieces 18, 28 and a mechanism of moving the driven magnet array. Also, the support plate 30 is shown in a cross-sectional view, and the slit 32 is shown.

The rotation axis 26 is integrally attached to the center of the disc 22 so that the disc 22 and the rotation axis 26 are integrally supported on the support plate 30 such as to be rotatable. The rotation axes 26 are equally spaced along the circumferential direction around the rotation axis 16 of the disc 12.

When the magnetic coupling device 100 according to the present invention is used for a vacuum deposition apparatus, the driving magnet array 10 is placed in the atmosphere and the driven magnet arrays 20 are placed in a vacuum atmosphere. Therefore, the system on the driven side including the driven magnet arrays 20 is divided by a partition member (not shown). The basic configuration of the vacuum deposition apparatus is well known and illustration and description thereof will be omitted.

While the second permanent magnets 24 arranged on the lower surface of the discs 22 are in a circular sector shape as shown in FIG. 2A, the magnets may be in an annular sector shape similarly to the first permanent magnets 14. The second permanent magnets 24 have an array of six poles, but the number of poles is not limited to this. A preferable number of poles (number of magnets) is from 4 to about 48, depending on the size of the magnetic coupling device 100.

The second permanent magnets 24 in a circular sector shape would have three corners, which need not be sharp, and may be rounded similarly to the first permanent magnets 14 for reasons in terms of production or the like. Alternatively, a chamfer of a suitable size may be provided.

The fewer the number of poles of the second permanent magnets 24, the poorer the followability of the driven magnet array 20. Too large a number of poles will increase the effect of the areas of inevitable spaces between adjacent second permanent magnets 24, which raises the issue of lowered torque. This applies also to the first permanent magnets 14.

Rare earth magnets are a preferable material for the first permanent magnets 14 and second permanent magnets 24, and specifically, samarium-cobalt magnets or neodymium magnets are selected. This does not mean that the magnets should be limited to specific materials.

<Relative Positional Relationship Between Permanent Magnets>

Next, the relative positional relationship between the first permanent magnets 14 and the second permanent magnets 24 will be described. FIG. 2A shows part of the driving magnet array 10 and only one of the plurality of driven magnet arrays 20.

An arbitrarily given one of the multiple first permanent magnets 14 will be referred to as a specific first permanent magnet 140, and reference numeral 141 is assigned to the two first permanent magnets adjacent thereto.

An arbitrarily given one of the multiple second permanent magnets 24 will be referred to as a specific second permanent magnet 240. Reference numeral 241 is assigned to the two second permanent magnets adjacent thereto. Let us now consider a condition where, given the specific first permanent magnet 140 has S pole, the opposite specific second permanent magnet 240 has N pole. Given the specific first permanent magnet 140 has N pole, the opposite specific second permanent magnet 240 has S pole. In this condition, the opposite poles face each other as shown in FIG. 2B so that the driving magnet array 10 and the driven magnet array 20 are stopped in a stable manner because a large attractive force acts between them.

A first centerline X1 along the radial direction of the first permanent magnet 14 is a straight line that divides the annular sector equally on left and right and that passes through the center of the rotation axis 16. A second centerline X2 along the radial direction of the second permanent magnet 24 is a straight line that divides the circular sector equally on left and right and that passes through the center of the rotation axis 26. As shown in FIG. 2A, the first centerline X1 of the specific first permanent magnet 140 and the second centerline X2 of the specific second permanent magnet 240 coincide and overlap with each other. FIG. 2B is a cross-sectional view cut along the centerlines X1 and X2.

As shown in FIG. 2A, the attraction zone Y includes three attraction zones Y1, Y2, and Y3. The repulsion zone Z includes four repulsion zones Z1, Z2, Z3, and Z4. In the attraction zone Y1, an attractive force acts between the specific first permanent magnet 140 and the specific second permanent magnet 240. In the attraction zone Y2 and Y3, an attractive force acts between the first permanent magnets 141 and the second permanent magnets 241 adjoining the specific first permanent magnet 140 and the specific second permanent magnet 240. FIG. 2C is a partially enlarged view of FIG. 2A with the shading omitted so that the boundary between a repulsion zone and an attraction zone can be more easily seen.

In the repulsion zones Z1 and Z2, a repulsive force acts between the specific first permanent magnet 140 and the adjacent second permanent magnets 241. In the repulsion zones Z3 and Z4, a repulsive force acts between the adjacent first permanent magnets 141 and the specific second permanent magnet 240.

In FIG. 2A, the first repulsion zones Z1 and Z3 and the second repulsion zones Z2 and Z4 on both sides of the centerlines X1 and X2 have same areas. Therefore, in this state, the magnet arrays rest stably as no torque is generated.

In the state of FIG. 2A, the outer circumferential end of the driving magnet array 10 and the outer circumferential end of the driven magnet array 20 coincide with each other.

<Principle of Driven Rotation>

Figure 3:
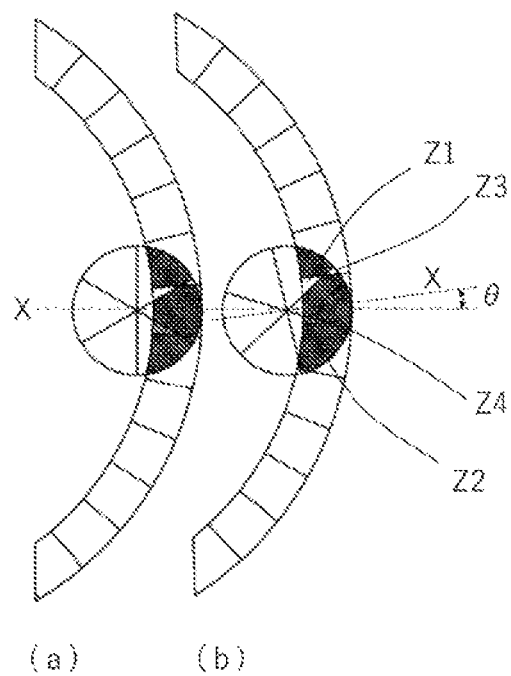
FIG. 3 is an illustrative diagram of a principle of how the driven magnet array is rotated.

Next, the principle of how the driven magnet array 20 is rotated by rotating the driving magnet array 10 will be described with reference to FIG. 3. FIG. 3(a) illustrates the same state as that of FIG. 2A. FIG. 3(b) illustrates the positional relationship of the driven magnet array 20 relative to the driving magnet array 10 when the driving magnet array 10 is rotated clockwise a predetermined angle from the state on the left side. As shown, rotating the driving magnet array 10 clockwise a predetermined angle brings the driven magnet array 20 to a state where the array is rotated θ° counterclockwise relative to the driving magnet array 10.

While the state of FIG. 3(a) is a stable rest condition, when the driving magnet array 10 rotates clockwise, the driven magnet array 20 comes to a state where the array is rotated counterclockwise relative to the driving magnet array 10, so that the areas of the first repulsion zones Z1 and Z3 become larger than the areas of the second repulsion zones Z2 and Z4, which is an unstable condition. Therefore a torque is generated in a direction in which the magnet arrays return to the position of FIG. 3(a), i.e., in which the driven magnet array 20 rotates clockwise. Accordingly, as the driving magnet array 10 keeps rotating clockwise, the driven magnet array 20 continues to rotate clockwise, following the former.

The areas of the first repulsion zones Z1 and Z3 are expressed as $\alpha + \Delta\alpha$ and the areas of the second repulsion zones Z2 and Z4 are expressed as $\alpha - \Delta\alpha$, where $\alpha$ denotes the areas of the first repulsion zones Z1 and Z3 in FIG. 2A, and $\Delta\alpha$ denotes an increment in area of the first repulsion zones Z1 and Z3 when the driving magnet array 10 is rotated θ°. The driven magnet array 20 rotates in a direction in which the areas of the first repulsion zones Z1 and Z3 equal to the areas of the second repulsion zones Z2 and Z4, i.e., $\Delta\alpha = 0$. Here, the smaller the areas $\alpha$ of the first repulsion zones Z1 and Z3, the more $\Delta\alpha$ affects $\alpha$, meaning the torque is generated more promptly in the driven magnet array 20 so that the array follows the driving magnet array 10 better.

On the other hand, if the areas $\alpha$ of the first repulsion zones Z1 and Z3 are too small, the braking effect is lost and there is a risk that the driven magnet array 20 may overrun. The inventors of the present invention found out through investigation that the driven magnet array 20 can follow the driving magnet array 10 well, rotate at constant speed, and smoothly start and stop rotation if the total area of the repulsion zones Z1 to Z4 (with opposite surfaces having the same polarity (S pole facing S pole, or N pole facing N pole)) is 5% to 15% of the attraction zones Y1 to Y3 (with opposite surfaces having opposite polarities (S pole facing N pole, or N pole facing S pole)).

Figure 4:
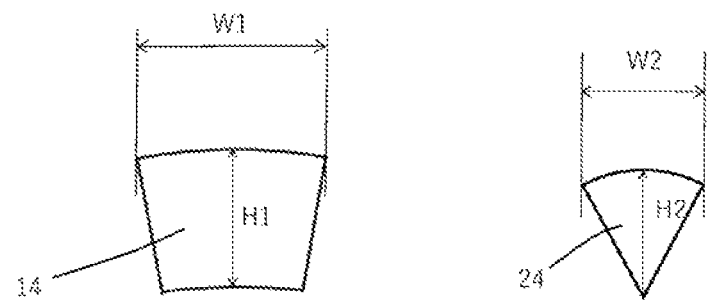
FIG. 4 is an illustrative diagram of preferable shapes of first permanent magnets and second permanent magnets.

To satisfy the above condition, the second permanent magnets 24 of the driven magnet array 20 should preferably have a circumferential width W2 that is 50% to 150% of the circumferential width W1 of the first permanent magnets 14 of the driving magnet array 10, as shown in FIG. 4. The radial height H1 of the first permanent magnets 14 should preferably be 50% to 150%, specifically, of the radial height H2 of the second permanent magnets 24, considering that the driven magnet array 20 could be shifted closer to the rotation axis 16 as will be described later, so as to ensure that, when the driving magnet array 10 and driven magnet array 20 are positioned as illustrated in FIG. 2A, there is a certain overlapping area between the magnet 14 and the magnets 24 of the outer half (three in the example of FIG. 2A) and that the magnet 14 does not overlap the magnets 24 of the inner half (three in the example of FIG. 2A).

Figure 5:
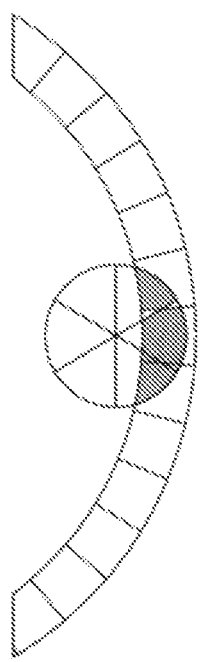
FIG. 5 is an illustrative diagram of shifting of the driven magnet array.

The driven magnet array 20 may be supported such that the outer circumferential end of the second permanent magnet 24 is shifted from the outer circumferential end of the first permanent magnet 14 toward the rotation center of the driving magnet array 10 (radial direction of the first permanent magnet 14) by 0% to 50% of the radial height H2 of the second permanent magnet 24, as shown in FIG. 5. This allows for adjustment of the ratio of areas between the repulsion zones and the attraction zones without changing the number of magnetic poles of the driving magnet array 10 and the number of magnetic poles of the driven magnet array 20. There is also a possibility that the followability of the driven magnet array 20 could be improved by a shift in position.

The mechanism of moving the driven magnet array 20 along a radial direction is not limited to a particular one, and various mechanisms are possible. For example, the support plate 30 may be formed with slits, and a mechanism that guides the rotation axes 26 may be adopted, to cause the driven magnet arrays 20 and rotation axes 26 to move along the radial direction. After adjusting the position, the magnet arrays are fixed in position with a mechanism such as bolts and nuts.

Table 1 shows calculation examples of the ratio of areas between the repulsion zones and the attraction zones when the numbers of poles, widths W1 and W2, and heights H1 and H2 of the first permanent magnets 14 and second permanent magnets 24 are varied. While the driving magnet array 10 has a radius of 86 mm and the driven magnet array 20 has a radius of 32 mm in the examples shown in Table 1, the present invention is not limited by these values and is applicable to a magnetic coupling device 100 of any size. In Table 1, the driven magnet array 20 is at a "standard" position when there is no "shift" in the second permanent magnets 24 as has been described above, and at a "shifted" position when the driven magnet array 20 is shifted radially inward by 2 mm as shown in FIG. 5.

TABLE 1

| | 60 poles | | 50 poles | | 40 poles | | | |
|---|---|---|---|---|---|---|---|---|
| No. of magnetic poles of drive gear | 60 poles | | 50 poles | | 40 poles | | | |
| No. of magnetic poles of driven gear | 10 poles | | 8 poles | | 6 poles | | 4 poles | |
| Position of driven gear | Standard | Shifted | Standard | Shifted | Standard | Shifted | Standard | Shifted |
| Magnet width of driven gear (mm) | 10.05 | | 12.57 | | 16.75 | | 25.13 | |
| Magnet height of driven gear (mm) | 16 | | 16 | | 16 | | 16 | |
| Magnet width of drive gear (mm) | 8.79 | | 10.55 | | 13.19 | | 13.19 | |
| Magnet height of drive gear (mm) | 12 | | 12 | | 12 | | 12 | |
| Area of repulsion zone (mm$^2$) | 59.4 | 28.7 | 44.7 | 20.6 | 29.4 | 17.7 | 47.6 | 45.2 |
| Area of attraction zone (mm$^2$) | 233.8 | 202.0 | 247.7 | 211.3 | 263.8 | 212.9 | 246.6 | 185.4 |
| Repulsion zone/Attraction zone (%) | 25% | 14% | 18% | 10% | 11% | 8% | 19% | 24% |

Pole pieces may be disposed on the surfaces of the first permanent magnets 14 and the second permanent magnets 24 (on the surfaces facing each other). The pole pieces, which are preferably made of a ferromagnet, can make the magnetic fields generated by the magnets more uniform. The pole pieces may have a size and shape such as to cover each of the magnets.

EXAMPLES

Figure 6:
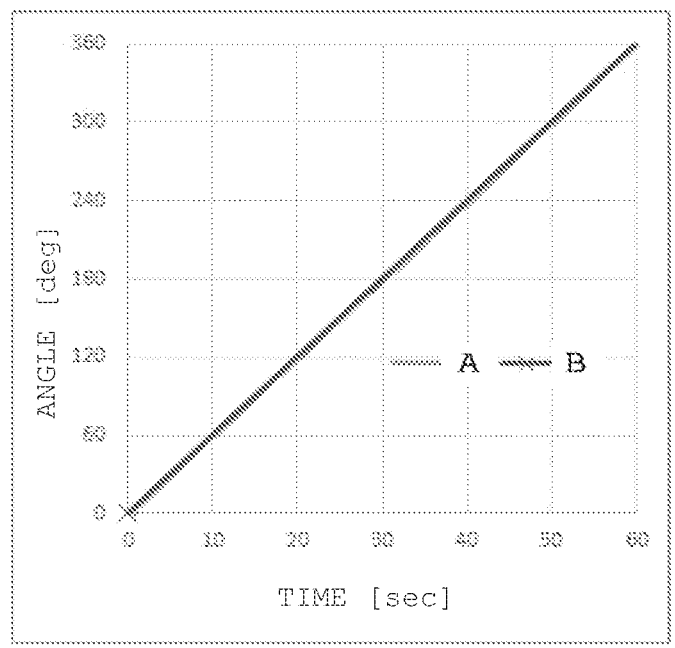
FIG. 6 is a graph showing a test result of Examples 1 and 2.
Figure 7:
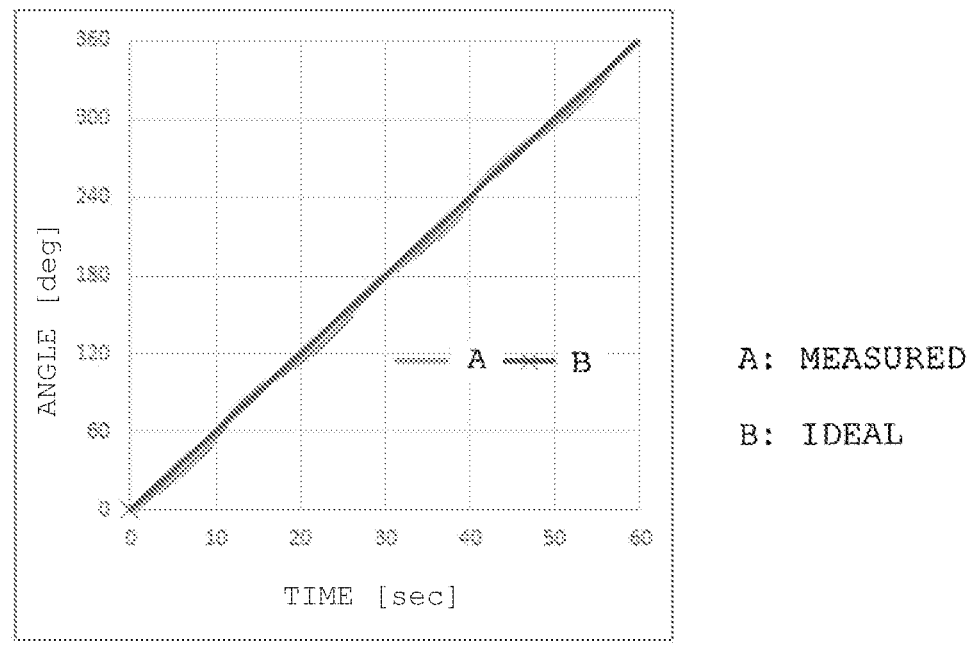
FIG. 7 is a graph showing a test result of Comparative Example 1.
Figure 8:
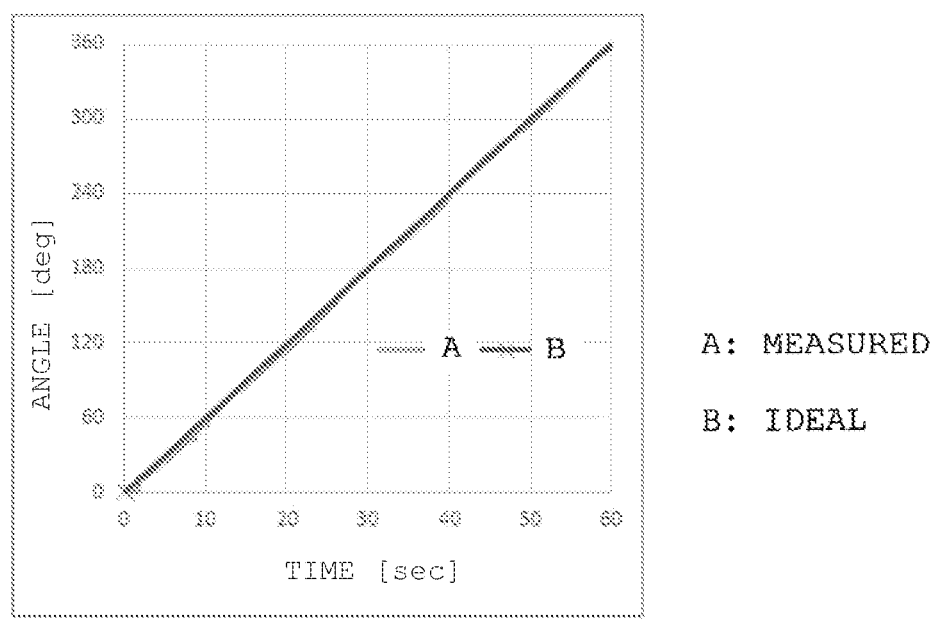
FIG. 8 is a graph showing a test result of Comparative Example 2.

Actual magnetic coupling devices were made for Examples 1 and 2 and Comparative Examples 1 and 2 of Table 2, and tests were conducted in which the driven magnet arrays 20 were rotated at a constant speed of 1 rpm. In this case, we investigated whether or not there were points where the driven magnet arrays 20 stopped for 0.2 sec. or more, the angle of displacement of the driven magnet array 20 when the rotation was stopped (degree of overrun), and the followability (match between an ideal constant-speed rotation and the rotation angle of the driven magnet array). The results are shown in Table 2, and FIG. 6 to FIG. 8. FIG. 6 to FIG. 8 show the movement until the magnet array makes one turn. If plotted, the graph would be similarly linear afterwards.

The test result of the followability of Example 1 are as shown in FIG. 6. The result of the followability of Example 2 is similar to Example 1 and as shown in FIG. 6. FIG. 7 shows the test result of Comparative Example 1, and FIG. 8 shows the test result of Comparative Example 2. The rpm can be monitored by attaching a known encoder.

TABLE 2

| | Example 1 | Example 2 | Comparative Example 1 | Comparative Example 2 |
|---|---|---|---|---|
| No. of magnetic poles of drive gear | 40 poles | | | |
| No. of magnetic poles of driven gear | 6 poles | | 4 poles | |
| Number of driven gears | 5 | | | |
| Distance between driving magnet and driven magnet (mm) | 7.5 | | | |

TABLE 2-continued

| | Example 1 | Example 2 | Comparative Example 1 | Comparative Example 2 |
|---|---|---|---|---|
| Position of driven gear | Standard | Shifted | Standard | Shifted |
| Magnet width of driven gear (mm) | 16.75 | | 25.13 | |
| Magnet height of driven gear (mm) | 16 | | | |
| Magnet thickness of driven gear (mm) | 2.5 | | | |
| Magnet width of drive gear (mm) | 13.19 | | | |
| Magnet height of drive gear (mm) | 12 | | | |
| Magnet thickness of drive gear (mm) | 4 | | | |
| Area of repulsion zone (mm$^2$) | 29.4 | 17.7 | 47.6 | 45.2 |
| Area of attraction zone (mm$^2$) | 263.8 | 212.9 | 246.6 | 185.4 |
| Repulsion zone/Attraction zone | 11% | 8% | 19% | 24% |
| Points of stop for 0.2 sec. or more | None | None | None | 2 points |
| Angle of displacement when stopped (deg.) | 0.4 to 0.6 | 0.4 to 0.6 | 0.2 to 0.5 | 0.5 to 0.9 |
| Followability | ⊙ FIG. 6 | ⊙ | Δ FIG. 7 | ○ FIG. 8 |

As can be seen from Table 2, the magnet arrays of Example 1 and Example 2, with the ratio of areas between the repulsion zones and the attraction zones being in the range of 5% to 15%, did not come to a stop, and the degrees of overrun when stopping fell within a small range of 0.4° to 0.6°. As FIG. 6 shows, the rotation angle of the driven magnet array relative to the time axis stayed substantially on the line of an ideal constant-speed rotation, which means that the magnet array rotated at the constant speed of 1 rpm.

In contrast, the driven magnet array of Comparative Example 1 with the ratio of areas between the repulsion zones and the attraction zones being out of the range of 5% to 15% had a degree of overrun when stopping as low as Examples 1 and 2, but the rotation angle of the driven magnet array relative to time did not stay on the ideal line as shown in FIG. 7, which indicated that the driven magnet array had poor followability and failed to rotate at constant speed. The driven magnet array of Comparative Example 2, which was shifted radially inward by 2 mm showed somewhat improved followability as shown in FIG. 8. However, the magnet array stopped twice for 0.2 sec. or more per one rotation, and the degree of overrun when stopping was larger than those of Examples 1 and 2. Such stops cause scars, particle generation, and adverse effects on uniform deposition, and therefore must be reduced to less than 0.2 sec.

OTHER EMBODIMENTS

The magnetic coupling device according to the present invention is primarily used for a vacuum deposition apparatus, but may also be used in other devices for other purposes.

While two permanent magnets 141 adjoin the specific first permanent magnet 140, one on each side as shown in FIG. 2, there may be a case where the repulsion zone or attraction zone extends over to permanent magnets further adjoining the adjacent magnets, depending on the size of the driving magnet array 10 or driven magnet array 20, or the size of the first or second permanent magnets 14 or 24. These permanent magnets further adjoining the adjacent magnets can also be included in the definition of the term "adjacent".

What is claimed is:

1. A magnetic coupling device, comprising:
   a driving magnet array having a plurality of first permanent magnets in an annular sector shape arranged to have alternating polarities along a circumferential direction; and
   a driven magnet array having a plurality of second permanent magnets in an annular or circular sector shape arranged to have alternating polarities along a circumferential direction and to have pole surfaces facing pole surfaces of the first permanent magnets,
   wherein the driving magnet array is configured to be rotated, and the driven magnet array is configured to be rotated when the driving magnet array is rotated,
   wherein when a first centerline in a radial direction of an arbitrary one of the plurality of first permanent magnets overlaps a second centerline in a radial direction of an arbitrary one of the plurality of second permanent magnets so that opposite poles of the respective driving magnet array and driven magnet array face each other,
   a repulsion zone where a repulsive force acts has an area that is in a range of 5% to 15% of an area of an attraction zone where an attractive force acts, wherein the repulsion zone includes a first permanent magnet adjacent the arbitrary one of the plurality of first permanent magnets and a second permanent magnet adjacent the arbitrary one of the plurality of second permanent magnets.

2. The magnetic coupling device according to claim 1, wherein the first permanent magnets are arranged along a circumferential direction with space between adjacent first permanent magnets due to one or both of (i) surface roughness of the adjacent first permanent magnets and (ii) errors in assembly or production, and wherein the second permanent magnets are arranged along a circumferential direction with space between adjacent second permanent magnets due to one or both of (a) surface roughness of the adjacent second permanent magnets and (b) errors in assembly or production.

3. The magnetic coupling device according to claim 1, further comprising a mechanism configured to move the driven magnet array along a radial direction of the first permanent magnets.

4. The magnetic coupling device according to claim 1, further comprising a pole piece comprising a ferromagnet provided on pole surfaces of the first permanent magnets and the second permanent magnets.

5. The magnetic coupling device according to claim 2, further comprising a mechanism configured to move the driven magnet array along a radial direction of the first permanent magnets.

6. The magnetic coupling device according to claim 2, further comprising a pole piece comprising a ferromagnet provided on pole surfaces of the first permanent magnets and the second permanent magnets.

7. The magnetic coupling device according to claim 3, further comprising a pole piece comprising a ferromagnet provided on pole surfaces of the first permanent magnets and the second permanent magnets.

8. The magnetic coupling device according to claim 5, further comprising a pole piece comprising a ferromagnet provided on pole surfaces of the first permanent magnets and the second permanent magnets.

* * * * *